T. LEACH,

Assignor to REED & BARTON.

Ice-Pitcher.

No. 8,707. Reissued May 13, 1879.

WITNESSES:

W. W. Hollingsworth

Edw. W. Byrn.

INVENTOR:

Thos. Leach

BY

ATTORNEYS.

N. PETERS, PHOTO-LITHOGRAPHER, WASHINGTON, D. C.

UNITED STATES PATENT OFFICE.

THOMAS LEACH, OF TAUNTON, MASSACHUSETTS, ASSIGNOR TO REED & BARTON, OF SAME PLACE.

IMPROVEMENT IN ICE-PITCHERS.

Specification forming part of Letters Patent No. 80,748, dated August 4, 1868; Reissue No. 8,707, dated May 13, 1879; application filed April 4, 1879.

*To all whom it may concern:*

Be it known that I, THOMAS LEACH, of Taunton, in the county of Bristol and State of Massachusetts, have invented a new and Improved Ice-Pitcher; and I do hereby declare that the following is a full, clear, and exact description of the same, reference being had to the accompanying drawings, forming part of this specification, in which—

Figure 1:
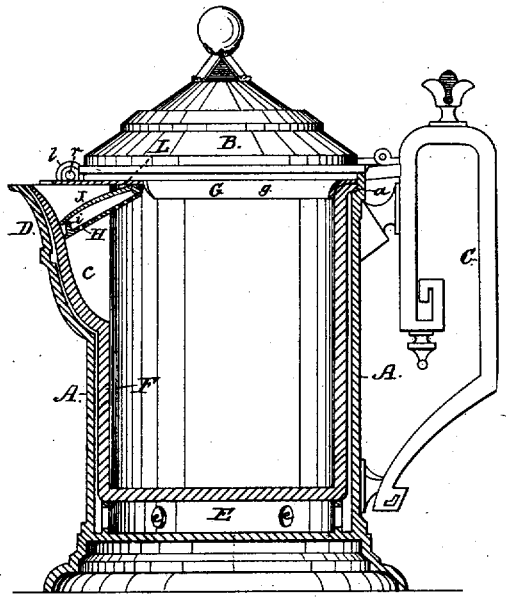
Figure 2:
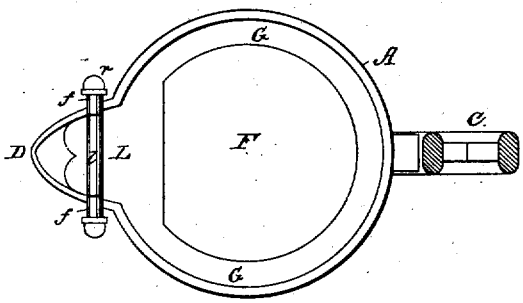

Figure 1 is a vertical section; Fig. 2, a plan view with the cover removed.

The object of my invention is to provide an improved ice-pitcher which shall preserve the water in a pure condition without contact with the metal, which shall economize the use of ice by isolating the same from the conducting metal, and which shall also, to a great extent, prevent the condensation of moisture on the outer surface of the pitcher.

In securing these ends my invention proceeds upon the general principle of lining the outer metal casing of the pitcher with glass, porcelain, china, or analogous material, which I do not broadly claim.

My improvements consist, first, in providing such a construction of lining as will effectually prevent all contact between the water and the metallic case, the same being accomplished by making the lining detachable and forming it with a spout, which, when in place, is continued up into the spout of the metal casing; secondly, in providing means for holding said detachable lining in the metal case, and yet permitting it to be readily removed, so as to be cleaned or replaced by another when broken.

The invention consists, also, in other details of construction of minor importance, as hereinafter fully described, and pointed out in the claims.

In the drawings, A is the metallic casing or outer wall of the pitcher; B, the cover; C, the handle, and D the nose or spout. To the bottom of this metal casing, upon the inside, is firmly attached a ring or flange, E, having several openings, *e e*, which permit the air to circulate freely around the pitcher. Inside of this pitcher I set another pitcher, F, composed of glass, earthenware, china, or other analogous material, the said glass or china lining being of less diameter than the opening in the top of the pitcher, so as to permit it to be inserted through the same in fitting the lining in place. This inner lining is so shaped as to seat itself firmly upon the ring E at the bottom, and has at the top an outward flare or flange, *a*, that rests closely upon the shoulder of an annular recess formed in the upper edge of the metal casing. This flange and the ring E at the bottom serve together to hold the lining concentrically in the metal casing, with a non-conducting air-space between.

In constructing this lining of glass or earthenware it is formed with a spout or nose, *c*, that fits in and extends up to the extremity of the nose of the outer metal casing.

The advantage secured by this construction is that, in tilting the pitcher for pouring the water, the latter at no time comes in contact with the metal, and the conduit for the water being a smooth continuation of the glass lining, there is no crack or seam for the leakage of water or lodgment of sediment between the lining and outer case. The entrance of the glass spout into the metal spout also serves to lock the lining against all axial movement, and holds it firmly in its proper place.

G is a ring of plated metal or silver, which fits down upon the top of the glass flange *a*, and is itself provided with a flange, *g*, all around its inner edge, which projects down inside of the glass lining. This ring serves not only to hold the lining down, but it completely protects the upper edge of the brittle glass or other material of which the lining is made from being broken by the insertion of the ice or the sliding forward of the same when the pitcher is tilted.

With respect to the protective agency of the flange, however, I do not claim it thus broadly, as I am aware that a similar flange is employed in the patent to Alonzo Hebbard, granted November 3, 1857. In such case, however, the flange was a permanent fixture upon the upper edge of the metal casing, and the glass or porcelain lining was inserted from below. My ring and flange, it will be seen, in being detachable, permit the insertion or removal of the glass or china lining at the top.

For securing the ring detachably in its place, it is widened into a lip, L, on that side next to the spout, and has a tubular sleeve, *l*, through which is extended a screw-rod, *r*, secured in lugs *f f*, formed on each side of the metal spout. Under the lip L is a filter or screen, consisting of an inclined foraminated plate of metal, H, attached at its upper edge to the inner edge of the lip, and fitting closely to the lower part of the nose or spout of the glass lining. A flange, *i*, extends around the filter on its upper side, forming, in conjunction with it, a kind of box having a foraminated bottom, which box is closed by a lid or valve, J, of plated metal, hinged just under the lip L at the upper end of the filter. This valve opens upward by the pressure of the water when the pitcher is inclined, and shuts down again by its own weight when the pitcher is placed erect.

It will be seen that the ring G, lip L, and valve-box are all connected together, forming one piece, which can be readily inserted or removed when the lid of the pitcher is raised.

Among the incidental advantages of my invention may be mentioned the following: The non-conducting properties of the glass and the air-space about the same preserve the ice and prevent its melting, thereby economizing the use of ice and rendering the supply of cold water more constant and unfailing. As the cold is not imparted to the outer casing to so great an extent as when the ice is in contact with the metal walls, the outer walls will remain comparatively warm, and but little condensation will take place upon the same, leaving the pitcher neat and dry. The lining being made detachable, it may be easily replaced when broken; or the outer casing may be used as a pitcher without any lining.

I design manufacturing the pitchers of definite sizes and shapes, to be numbered, so that when the lining of one is broken the owner need only order a lining of such a number, without sending the pitcher to be fitted with a lining, the means for holding the removable lining being such as to permit unskilled persons to readily fit and secure it in place.

For confining the detachable lining I do not limit myself to the ring G, since in the use of some of the features of my invention I may employ a plate or other form of device for holding the glass lining in place.

Having thus described my invention, what I claim as new is—

1. The combination, with a metal pitcher, of an inner detachable lining of glass, porcelain, china, or analogous material, having a nose or spout continued or extended up into the nose or spout of the metal pitcher, substantially as shown and described.

2. The combination, with the metallic pitcher A, of a removable lining of glass, porcelain, china, or analogous material, and a removable ring or its equivalent, made separate from both the pitcher and lining, and adapted to connect the two together, substantially as described.

3. The combination, with the metallic pitcher A, of a removable lining of glass or analogous material, made of less diameter than the opening in the top of the pitcher, and a removable device at the top of the pitcher for securing said lining, substantially as described.

4. The removable lining E, made of glass or analogous material, and having an outwardly-flared rim, *a*, at the top, in combination with the metal pitcher, having an annular shoulder or recess to receive said flared edge, and a flanged ring or its equivalent for securing said flared edge, substantially as described.

5. The combination of the ring G, filter H, and valve J, connected together and made together removable, substantially as described.

6. The ring G, having a tubular sleeve, *l*, in combination with the metallic pitcher having lugs *f f*, and the screw-rod *r* for connecting the two together, substantially as shown and described.

THOMAS LEACH.

Witnesses:
THEO. P. HALL,
F. E. FISKE.